R. DE L. CRUM.
NOSE PROTECTOR FOR HORSES.
APPLICATION FILED NOV. 4, 1910.
1,044,864.
Patented Nov. 19, 1912.
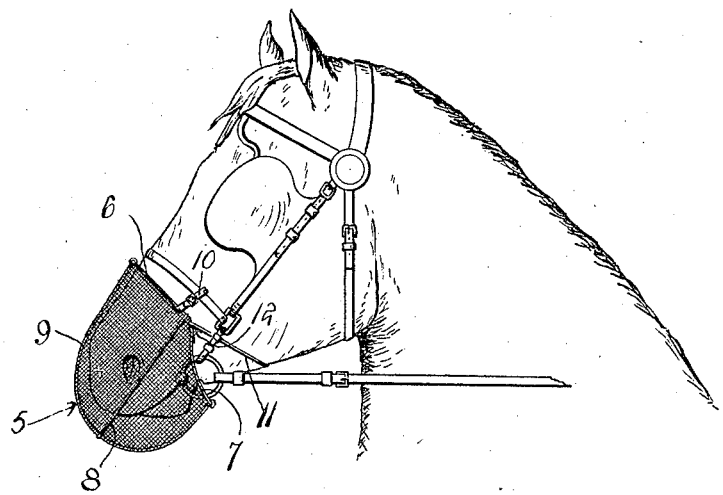
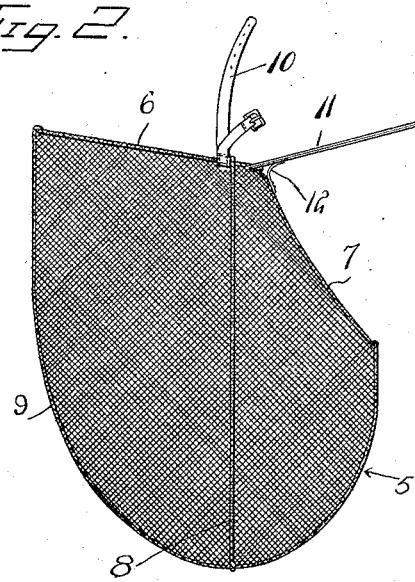
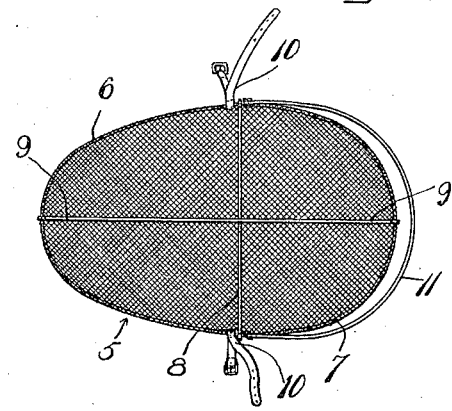

UNITED STATES PATENT OFFICE.

ROSCOE DE LAPP CRUM, OF McKENZIE, NORTH DAKOTA.

NOSE-PROTECTOR FOR HORSES.

1,044,864. Specification of Letters Patent. Patented Nov. 19, 1912.

Application filed November 4, 1910. Serial No. 590,718.

*To all whom it may concern:*

Be it known that I, ROSCOE D. CRUM, a citizen of the United States, residing at McKenzie, in the county of Burleigh, State of North Dakota, have invented certain new and useful Improvements in Nose-Protectors for Horses; and I do hereby declare the following to be a full, clear, and exact description of the invention, such as will enable others skilled in the art to which it appertains to make and use the same.

This invention relates to improvements in devices for protecting the nostrils of horses and other animals against insects and the leading object of the invention is to provide a wire net adapted to be positioned over an animal's nostrils which will effectively prevent an insect such as a fly from approaching too closely to the flesh of the animal and thereby annoying and inflicting pain on the animal.

With the above and other objects in view the invention consists in certain constructions, combinations and arrangements of parts, clearly described in the following specification and clearly illustrated in the accompanying drawings, in which:—

Figure 1 is a side view showing the device applied. Fig. 2 is a side elevation showing the device detached. Fig. 3 is a top plan view thereof.

Referring to the accompanying drawings 5 denotes a bag-shaped wire mesh body having its upper edge reinforced by a stout wire or reinforcing member 6, said wire or reinforcing member being curved at 7 to pass under the neck of a horse or animal. A U-shaped member or wire 8 extends from the upper edge of the body 5 around said body down one side thereof and up the other side to hold the sides of the body normally apart from each other, whereby the body will be held normally opened. A second brace wire or U-shaped member 9 extends from the forward portion of the upper edge of the body downwardly and then upwardly terminating at the rearward upper edge of the body. The bag like body 5 is supported on the head of a horse or other animal by means of attaching devices or straps 10. A U-shaped member 11 is pivoted at its ends to the top reinforcing wire 6 and springs 12 are arranged around said pivoted ends so as to hold said U-shaped member normally above the rear upper edge of the bag 5, and if desired flexible wire mesh may be connected with said screen and with said U-shaped member 11 and the rear upper edge of the bag 5 so as to protect the flesh of the horse carrying the device during the various movements of the neck. The U-shaped member 11 serves the purpose of holding the bag upwardly upon the nose of the animal, but to permit free movement of the animal's head upwardly and downwardly which is greatly facilitated under the actions of the springs 12.

The improved nose protector can be very cheaply manufactured and will effectively protect an animal from the annoyance of insects.

What is claimed is:—

1. A nose protector for animals consisting of a bag like body made of wire mesh adapted to exclude the entrance of insects and formed with a reinforcing member encircling the upper edge of said body and curved downwardly in its rearward portion to fit under the chin of an animal and further provided with U-shaped vertical brace members disposed at right angles to each other and adapted to hold the body normally opened, a U-shaped member pivoted at its ends to the reinforcing member on the upper edge of the body and adapted to bear against the under side of the animal's chin, springs for holding said member normally upward, and means for attaching the bag like body to the head of an animal.

2. In a nose protector for horses comprising a pair of U-shaped frames secured together at their bight portions at right angles, the rear leg of one frame terminating short of the upper ends of the other legs, a circular wire member connecting the upper ends of said leg portions and having its rear portion sloping downwardly, securing straps secured to the circular frame adjacent to the side legs of the other U-frame, an insect excluding covering for said parts, a U-shaped retaining member pivoted adjacent to said attaching straps, and flat springs secured to the upper ends of the sloping portions and engaging the sides of said retaining member to force the same upwardly.

In testimony whereof, I affix my signature, in presence of two witnesses.

ROSCOE DE LAPP CRUM.

Witnesses:
M. WHIPKEY,
J. B. SWANICK.

Copies of this patent may be obtained for five cents each, by addressing the "Commissioner of Patents. Washington, D. C."